United States Patent [19]

Flesher et al.

[11] Patent Number: 4,950,725

[45] Date of Patent: Aug. 21, 1990

[54] PARTICULATE POLYMERS, THEIR PRODUCTION AND USES

[75] Inventors: Peter Flesher, Bingley; David Farrar, Bradford; Adrian Allen, Skipton, all of Great Britain

[73] Assignee: Allied Colloids Limited, England

[21] Appl. No.: 354,889

[22] Filed: May 19, 1989

[30] Foreign Application Priority Data

May 20, 1988 [GB] United Kingdom ............... 8811958
Nov. 16, 1988 [GB] United Kingdom ............... 8826822

[51] Int. Cl.$^5$ ........................................ C08F 220/06
[52] U.S. Cl. ............................ 526/307.6; 526/317.1;
526/287
[58] Field of Search ............ 526/317.1, 307.6, 287;
523/336, 337

[56] References Cited

U.S. PATENT DOCUMENTS

| 4,554,018 | 11/1985 | Allen | 526/287 |
| 4,619,967 | 10/1986 | Emerson et al. | 523/336 |
| 4,720,346 | 1/1988 | Flesher et al. | 523/322 |
| 4,739,009 | 4/1988 | Heide et al. | 523/337 |
| 4,759,856 | 7/1988 | Farrar et al. | 523/322 |

Primary Examiner—Joseph L. Schofer
Assistant Examiner—R. H. Delmendo
Attorney, Agent, or Firm—Ostrolenk, Faber, Gerb & Soffen

[57] ABSTRACT

Polymer thickeners suitable for use as textile pigment print paste thickeners are particulate cross linked polymers having a particle size of below 20 μm and have defined physical characterization that indicates an optimum degree of cross linking and molecular size within the polymer.

14 Claims, No Drawings

PARTICULATE POLYMERS, THEIR PRODUCTION AND USES

This invention relates to polymers formed from water soluble ethylenically unsaturated monomers or blends of monomers and that are in the form of particles below 20 μm in size.

A polymer made by polymerisation of one or more monoethylenically unsaturated monomers is a mixture of molecules having various chain lengths and, often, various degrees of chain branching. In the particular instance of very low molecular weight, linear, ionic, soluble polymers that act as dispersing agents, it is known to be both desirable and possible to provide a very narrow range of chain lengths within any particular polymer (see for instance EP No. 0129329). However when making higher molecular weight linear polymers, a wide range of chain lengths is generally regarded as inevitable and satisfactory.

When the polymerisation mixture includes cross linking agent, this destroys the linearity of the polymer molecules. In any particular system, the degree of cross linking is generally directly proportional to the amount of cross linking agent. When the amount of cross linking agent is low, the polymer may be mainly in the form of branched chains but may still be truly soluble in water. As the amount of cross linking agent is increased, the polymer may tend to become insoluble in water (but highly swellable), in that the polymer particles swell in water but never go completely into solution, and the particulate nature is apparent upon, for instance, subsequent drying. When the amount of cross linking is increased still further, the particles remain insoluble but the swellability decreases and eventually, at sufficiently high levels of cross linking agent, the particles become substantially non-swelling. When the polymer is cross linked and insoluble (as opposed to merely being branched) the cross links create a three-dimensional network and so it is not possible to identify, even theoretically, any particular polymer chain or to quote in a meaningful manner a molecular weight for the chain or the network. Instead, cross linked polymer particles have tended to be regarded as consisting of homogeneous polymeric products of unmeasurable molecular size.

It is well known that particulate polymers that are swellable but insoluble in water have many interesting properties that make them suitable as, for instance, thickening agents for aqueous media (such as textile print pastes). If the degree of cross linking is relatively low and the swellability is relatively high then the polymer particles can give good viscosity, per unit weight of polymer, but rather poor rheology and low transfer values (i.e., relatively low amounts of paste are transferred on to the receiving substrate during printing). High levels of cross linking, and therefore low swellability, give lower viscosity per unit weight of polymer but, if enough polymer is added, it gives good rheology and high transfer values. Different cross linking systems give different degrees of cross linking and thus, in any particular process, it is possible to vary the rheology, transfer and viscosity properties in any particular system by varying the amount of cross linker or by varying the type of cross linker or both. Mixtures of cross linking agents can be used, for instance as in example 5 of EP No. 186361. That example is not specific about the other process conditions, for instance the particular initiator or its rate of addition.

Despite the ability to achieve some variation in any particular system of the performance of a cross linked polymeric thickener by varying the cross linker and its amount, it is recognised that it is necessary to make some improvements for some purposes. For instance it is recognised that some thickeners are less effective in the presence of electrolyte can significantly reduce the effectiveness of a thickener. This difficulty can be minimised by including an associative monomer in the monomers from which the polymer is made, for instance as described in EP No. 172724. However the incorporation of such monomers does not completely solve the problem. In particular it is inconvenient to have to add a second material in some instances, for instance when the pigment provides a high electrolyte concentration, but not in other instances. It would be preferable to provide a single thickening system that gave satisfactory viscosity, rheology and other properties despite wide variations in pigment or other components in the system that is to be thickened.

Another problem that arises in some pigment print pastes is flushing, that is to say poor print definition that occurs due to bleeding of the print paste along the fabric during or after printing. In EP No. 190002 it is proposed to include certain additives to minimise this, but again it would be desirable to provide a thickener that does not require blending with major amounts of other additives in order to improve its properties.

Another difficulty with polymers of this general type is that the only effective way of determining whether or not they are satisfactory for any particular printing system is to make up the ink using the chosen pigments and to test them in practice. This is commercially inconvenient and it would be much more desirable to be able to define, on the basis of simple laboratory tests, thickeners that can confidently be predicted to be suitable for use in a wide range of printing inks and textile print systems.

It is of course possible to vary the properties of the polymer by changing, for instance, the type or amount of cross linking agent or by changing the monomers that are used for forming the polymer. However these changes have been essentially random and experience has shown that although one change may improve some properties this has previously always been at the expense of worsening other properties and no way of rationalising this has previously been available.

It would therefore be desirable to provide an entirely new type of cross linked particulate polymeric material that minimises or avoids the problems encountered with all existing cross linked polymers.

It would also be desirable to be able to have a simple way of identifying the suitability of a polymer in terms of simple laboratory analytical techniques, since it would then be possible to determine in the laboratory, and at the point of manufacture, whether or not the polymer would be suitable for, for instance, a range of pigments and electrolyte concentrations or whether it would be suitable only for a very restricted type of pigment.

The invention is based in part on our appreciation that a cross linked particulate insoluble but swellable polymeric polymer probably contains a range of polymeric structures ranging from (a) substantially linear and highly soluble polymers through (b) branched but soluble polymers and (c) lightly or medium cross linked but highly swellable polymers to (d) heavily cross linked polymers. When, as in the case of thickeners, the manufacturer has intended to make a polymer that he regarded as highly swellable he will therefore have selected a cross linking system such that the predominant polymeric species is within the area (c), and by altering the amount of cross linker to modify his properties all he will have done is shifted the predominant species towards the area (d) or towards the area (b). In all instances, his product will still have contained substantial amounts that can be regarded as linear and/or branched soluble polymers and relatively heavily cross linked polymers.

The invention is based in part on the realisation of this mechanism, or some mechanism having similar effect, and on the fact that greatly improved properties are obtainable if the polymer is selected so as to minimise the amounts of the polymeric species other than those species that give optimum properties.

In particular the invention is based on the realisation that if the product contains too much linear or branched soluble polymer the rheological properties are inferior whilst if the polymer contains too much relatively highly cross linked polymer then the electrolyte sensitivity, flushing and other print properties are inferior.

By optimising the materials and polymerisation conditions, the invention provides novel polymers that have numerous uses but are of particular value as thickeners, especially for aqueous electrolytes, such as textile print pastes. These novel thickeners give improved properties over a wide range of composition and use conditions. The novel polymers are thought to have a novel combination of linearity, branching, cross linking and molecular size. It is unfortunately inpracticable to try to define the polymer in a meaningful manner on the basis of chemical analytical techniques. Techniques that are aimed at identifying the arrangement of monomeric units and internal bonds within a polymer are inadequately reliable to define the polymer in a meaningful and reproducible manner. Accordingly the novel polymers can only be defined in a meaningful manner in terms of their physical properties.

According to the invention, a particulate cross linked polymeric material is formed from a water soluble ethylenically unsaturated monomer or blend of monomers and has a dry particle size of below 20 μm and is characterised in that the polymeric material complies with (a) the limit stated in the Table below for at least one of the properties A to E and (b) the limit stated in the Table below for at least one of the properties F to J. It may comply with other parameters, for instance (c) the limit stated in the Table below for at least one of the properties K to M.

| Property | Limit | Preferred | Most Preferred |
|---|---|---|---|
| A Storage Modulus G' dynes/cm$^2$ | >600 | 750 | 950 |
| B Loss Modulus G" dynes/cm$^2$ | >500 | 540 | 580 |
| C Complex Modulus G* dynes/cm$^2$ | >8008 850 | 900 | |
| D Transfer g/m$^2$ | >70 | 75 | 90 |
| E % Soluble | <65 | 60 | 55 |
| F Storage Modulus G' dynes/cm$^2$ | <1400 | 1350 | 1200 |
| G % Na$_2$SO$_4$ for 50% drop | >0.2 | 0.5 | 0.8 |
| H % Viscosity retention | >80 | 85 | 90 |
| I Flushing mm | <6 | 3 | 1 |
| J % Soluble | >30 | 40 | — |
| K Loss Modulus G" dynes3cm$^2$ | <700 | 600 | — |
| L Complex Modulus G* dynes/cm$^2$ | <1500 | 1400 | 1200 |
| M Transfer g/m$^2$ | <115 | 105 | 100 |

Preferably property G is not above 1.2. Preferably property H is not above 98.

More detailed description of each of the properties A to M and the method of measuring it, is given below.

As an example of what we mean by saying that the polymeric material complies with the limit stated in the Table for at least one of properties A to E and at least one of properties F to J, consider a polymeric material that complies with the limits stated in the Table for properties A and I. Such a material has a storage modulus of at least 600, preferably at least 750 and most preferably at least 950 dynes/cm$^2$ and a flushing value of not more than 6, preferably not more than 3 and most preferably not more than 1 mm.

The polymer having the defined properties is made by conducting the polymerisation under conditions that, both on a microscale or molecular scale, and on a macroscale are more uniform than have been conventionally used for making cross linked particulate polymers. For instance it is conventional to use a single cross linking agent (even though a mixture was mentioned in example 5 of EP No. 186361). However the rate of reaction of most cross linking agents tends to be different from the rate of reaction of many of the monoethylenically unsaturated monomers that are used with the result that the proportion of cross linking agent that enters into the reaction is liable to change during the reaction period. As a result the degree of cross linking that is occurring is liable to change during the reaction period. In the invention it is necessary to maintain the rate of cross linking substantially constant throughout the reaction period.

This can be achieved by adding cross linking agent during the polymerisation process under conditions such that its availability for reaction is substantially constant throughout the process. Instead of or in addition to doing this it is desirable to use a blend of cross linking agents that comprises a cross linking agent that will react relatively fast and a cross linking agent that will react more slowly, so that the overall rate of reaction of total cross linking agent is substantially uniform.

Another way of rendering more uniform the availability of the cross linking agent is by selecting cross linking agents having regard to their solubility in the monomers that are to be polymerised. For instance when the polymerisation is being conducted in a non-aqueous environment (either reverse phase polymerisation or precipitation polymerisation) the availability of a cross linking agent at any particular stage during the reaction can be influenced by its relative solubilities in the monomer phase and the non-aqueous phase. For instance the availability of polyethylene glycol di (allyl ether) cross linking agents can be controlled by appropriate selection of the length of the polyethylene glycol chain. The availability of amine-containing cross-linking agents can be controlled by using them in the form of a salt that is more water soluble, e.g., a quaternary ammonium salt. Likewise other solubilising or insolubilising groups can be included in the cross linking agent.

Although other known cross linking agents can be used, preferably all the cross linking agents are polyethylenically unsaturated monomers. Suitable monomers include poly-acrylic monomers and poly-allyl monomers. It is often desirable to use a blend of the two types since the poly-acrylic monomers tends to react faster than the poly-allyl monomers. Suitable poly-acrylic monomers include methylene bis acrylamide, di-acrylamide, 2,2-bis(acrylamido)acetic acid, hexahydro 1,3,5-triacrylyl-s-triazene, and diacrylates and dimethacrylates of glycols or polyoxy alkylene glycols. These materials can all be added in carefully controlled quantities to give the desired amount of cross linking. Others that can be used include acrylamido methyl derivatives of carbohydrates, such as dextrins, starches and sugars, glycidyl methacrylate, and ethylene glycol di-glycidyl ether, but particular care may need to be exercised when using such materials to ensure that the amounts are accurately supplied, having regard to the side reactions that may occur during their formation or use.

Suitable polyallylic cross linking agents include diallyl urea, diallyl tartar diamide, diallyl phthalate, diallyl carbonate, diallyl amine, N,N-diallyl melamine, allyl ethers of glycols or polyoxy alkylene glycols, allyl ethers of polyols, triallyl cyanurate or isocyanurate, triallyl amine, 1,1,2,2-tetra-allyloxyethane, and hexa allyl melamine. Polyallyl derivatives of carbohydrates such as dextrins, starches and sugars can be used. Quaternary ammonium salts of triallyl amine, for instance triallyl methyl ammonium methsulphate, are preferred materials either for use alone or at the end of the reaction, after use of an acrylic cross linking agent in the earlier part of the reaction.

The amount of cross-linking agent depends on, inter alia, the molecular weight of the cross linking agent. It is usually in the range 0.005% (50 ppm) to 3% based on monomer, with amounts of 0.02 to 2% usually being suitable. The amount necessary to obtain chosen values selected from the group A to M can be determined by experiment.

The polymeric structure that is produced at any particular time is also influenced by the rate of initiation and so it is desirable to maintain this at a substantially constant rate throughout the polymerisation process. If the rate of initiation is relatively low then this will tend to result in polymers that have relatively long and unbranched chains between adjacent cross links, whilst if the rate is very high this will tend to produce polymers that have short chains and/or highly branched chains between adjacent cross links. In the invention it is desirable to have a higher rate of initiation than is customary for the production of cross linked thickeners. Thus typically the rate of initiator addition is 2 to 10 times, often around 5 times, the rate of initiator addition that has previously been used for making cross linked thickeners by similar processes. For instance when making cross linked thickeners by reverse phase polymerisation using a redox initiator system it has been conventional to add the initiator at 1 to 2 ppm per minute but in the invention it is generally desirable to add it at higher rates, for instance 3 to 20 ppm, often around 5 to 10, ppm per minute. Similarly the initiator should be added in such a way that it mixes into the polymerisation mixture very rapidly, for instance as a result of being added as a solution or emulsion that is readily miscible with the phase containing the polymerising monomer.

It is known that the incorporation of chain transfer agents depresses chain length and tends towards a more highly branched structure and another way of modifying the polymer properties, when desired, is by incorporating a small amount of chain transfer agent in the polymerising mixture. If chain transfer agent is being included, it is generally desirable to ensure that it is available throughout the process at substantially constant amount, and so may need to be added during the polymerisation process. Suitable chain transfer agents include lower alcohols such as methanol or isopropanol, butylene glycol, mercaptans such as 2-mercapto ethanol, thioglycollic acid, or formic acid or its salts.

The optimum amount required to give chosen values selected from A to M can be determined by experiment, and will depend on, inter alia, the chain transfer agent that is being used. Typically it is in the range 0.1 to 5% based on monomers.

The polymerisation temperature affects the polymeric structure that is produced and so it is desirable for the temperature to be controlled so as to avoid hot spots or other conditions that would lead to different degrees of cross linking. The polymerisation is normally exothermic and it is satisfactory to allow the temperature to rise during the process provided that the rise is controlled and does not lead to widely varying degrees of polymerisation. Instead of or in addition to this it can be desirable to maintain the temperature at a substantially uniform level for part of the polymerisation and then to allow the temperature to rise so as to complete the polymerisation of monomers and oligomers in the mixture. Suitable techniques for doing this are described in, for instance, EP No. 0123486A.

If the polymer is made from a blend of monomers then this blend must be water soluble and the components of the blend must be such that they are capable of copolymerising to give a polymer having the desired properties.

The polymer is generally made from anionic monomers either alone or blended with non-ionic monomers, for instance as in EP No. 161038. The anionic monomers are generally ethylenically unsaturated carboxylic or sulphonic monomers. Suitable sulphonic monomers include 2-acrylamido methyl propane sulphonic acid, allyl sulphonate, vinyl sulphonate, styrene sulphonate, methallyl sulphonate and sulpho-ethyl (meth) acrylate.

Suitable carboxylic monomers include methacrylic acid, crotonic acid, itaconic acid, maleic acid or, preferably, acrylic acid.

The polymerisation can be conducted in the free acid form or in a neutralised form or a partially neutralised form, for instance as described in EP No. 161038.

The preferred non-ionic comonomer is acrylamide but others that can be used include methacrylamide, hydroxy alkyl acrylates, acrylonitrile, vinyl acetate, $C_1$-$C_{18}$ alkyl (meth) acrylates, ethylene, styrene, N-vinyl pyrollidone, N-vinyl acetamide, N-vinyl formamides and N—$C_1$-$C_{18}$ alkyl or dialkyl acrylamides and associative monomers such as an acrylic ester or allyl ether of a polyethoxy substituted fatty alcohol or alkyl phenol for instance as described in EP No. 172724.

The invention is also applicable to cationic polymers, generally copolymers of acrylamide and dialkyl amino alkyl (meth) -acrylates or -acrylamides, generally present as acid addition or, preferably, quaternary ammonium salts.

The polymer is usually made from 10 to 100% by weight usually 50-100% ionic monomer, with the balance being non-ionic usually acrylamide. The polymer may be amphoteric.

The polymerisation process can be conducted by any of the techniques known for making cross linked synthetic polymers. It can be by precipitation polymerisation. It can be by any of the processes described in European application No. 89302648.4. Thus the polymer particles may be made by polymerisation of water soluble monomer or monomer blend in a substantially non-aqueous liquid reaction medium that is a solvent for the monomer or monomer blend and is a non-solvent for the particles. The solution of the monomer or monomer blend in the reaction medium may be formed in the presence of initiator and water in an amount of 4 to 50% by weight monomer or monomer blend, the monomer or monomer blend being polymerised while dissolved in the reaction medium and thereby forming the polymeric particles containing a little water. Irrespective of whether or not water is present, the particles may be made as a stable dispersion by conducting the polymerisation in the presence of a dispersion promoter selected from emulsifier and stabilisers, the amount of dispersion promoter being such that the particles form a stable dispersion in the reaction medium.

A preferred method of polymerisation is by reverse phase polymerisation. This is conducted by emulsifying, usually under high shear, aqueous monomer (typically containing 30 to 70%, preferably 40 to 60% by weight monomer) into a non-aqueous liquid of the type conventionally used for reverse phase polymerisations, for instance aliphatic or naphthenic hydrocarbons. A small amount of a low HLB emulsifier may be used, generally a non-polymeric emulsifier but optionally a block polymer such as a condensate of polyethylene glycol with poly 12-hydroxy stearic acid. Generally an amphipathic polymeric stabiliser is also included, for instance a co-polymer of hydrophobic acrylic ester and hydrophilic acrylic acid groups. The amounts of stabiliser and emulsifier may be conventional.

Depending upon the polymerisation process that is being used, the polymer particles may initially be formed as a dispersion of aqueous polymer particles in oil, in which event the dispersion may be dehydrated by azeotropic distillation in known manner to produce a dry dispersion.

The polymer particles generally have a dry size below 10 μm and often below 4 μm, for instance with 90% in the range 0.01 to 2 μm. They are often supplied in the form of a dispersion in non-aqueous liquid but can, alternatively, be provided as a dry powder, for instance when made by precipitation polymerisation. If they are being supplied as a powder then it may be convenient for the individual particles to be agglomerated into aggregates that are larger than 20 μm in size but which can break down, before or during use, to the desired size of below 20 μm. This reduces the risk of dusting problems.

The polymers of the invention are made by conducting the described processes as modified in accordance with the general guidance given above and in accordance with known ways of optimising the production of polymers. For instance, if any particular polymerisation process results in a product that seems to have too large a proportion of material that is insufficiently cross linked (non-compliance with parameters F to J) then it is desirable to increase the amount of cross linking at the end of the process, for instance by increasing the amount of allylic cross linking agent or by adding cross linking agent during the process. Instead of or in addition to doing this the amount of initiator, or its rate of addition, might be increased. Conversely, if the polymer appears to include components that are too highly cross linked (non-compliance with properties F to J) it is desirable to reduce the amount of cross linking agent at the start of the process, and perhaps also at the end of the process, and/or reduce the amount of initiator or its rate of addition.

Although it is not possible to identify the molecular weight of the cross linked polymers, it is possible to observe the molecular weight that would be obtained if a soluble polymer was made under the identical polymerisation process from the same materials but in the absence of cross linking agent. When the processes used in the invention for making the preferred polymers are conducted in the absence of any cross linking agent, the intrinsic viscosity of the resultant soluble polymer is generally above 2 or 3 dl/g but below 15, and usually below 12, dl/g. Although useful results can be obtained at values of, for instance, 8 to 12 dl/g, lower values are preferred. Thus it is preferred for the intrinsic viscosity to be in the range 3 to 6 dl/g. Generally it is at least 4, e.g., 4–5, dl/g.

Properties A to E are various ways of defining that the polymer does not contain too much linear or branched soluble polymer. Properties F to J (and also K to M) are various ways of defining that the polymer does not contain components that are sufficiently heavily cross linked that the electrolyte sensitivity and flushing performance and other properties are adversely affected. Unfortunately there is no better method, of which we are aware, of defining the nature of the polymeric molecules within the polymeric material. To some extent the properties A to E duplicate one another and so it can be sufficient to define the polymer solely in terms of one of these properties. Similarly, to some extent properties F to J duplicate one another and so it can be sufficient to define the polymer in terms of one only of these properties.

One preferred combination of properties is A and F. Other preferred combinations are A and G, A and I or A, G and I, often all with property F. Other preferred combinations of properties are D and G or D and I or D, G and I, often all with A and/or F.

The preferred combination of properties is A, F and G and so the preferred particulate cross linked polymeric material has a storage modulus of 600 to 1300 dynes/cm$^2$ and requires at least 0.2% sodium sulphate to give a 50% drop in viscosity (by the test methods defined below). The storage modulus is preferably at least 650 and most preferably at least 750 dynes/cm$^2$. It is preferably below 1100 and most preferably below 900 dynes/cm$^2$. The amount of sodium sulphate that is required for 50% viscosity drop is preferably at least 0.5% and most preferably at least 0.8%. The preferred products give a flushing value of below 6 mm, preferably below 3 mm and most preferably below 1 mm.

Polymeric materials that comply with the limits stated for at least one of the properties A to E and at least one of the properties F to J are new polymeric materials and so may be used for any purpose for which they are useful. For instance they can be used as wallpaper adhesives (either as brush-on adhesives or as prepastes) but preferably they are used as aqueous thickeners, most preferably as thickeners for print pastes.

The particulate material that complies with the two sets of limits is preferably a single polymeric material in the sense that it is made from a single polymerisation process or from two or more polymerisation processes that are intended to produce substantially identical materials. However it is also possible, in the invention, to provide a particulate cross linked polymeric material that complies with the specified limits by blending two or more different polymeric materials. Generally both of the polymeric materials are cross linked polymeric materials that comply with the defined limits but alternatively at least one of the polymeric materials in the blend may be a material that does not comply with the defined limits. For instance it may be possible to produce a useful polymeric material that, as a blend, complies with the defined limits by blending a small amount of a soluble polymer that does not comply with one or more of the limits A to E with a cross linked polymer in an amount such that the final blend does comply with the defined limits.

The properties discussed above are determined by the following test methods.

Percentage sodium sulphate for 50% viscosity drop (property G) and percent viscosity retention (property H)

5.0 g of 0.880 ammonia is stirred with 495 g deionised water using a Greaves STA high shear mixer at slow speed. Polymer (usually as a dry dispersion or emulsion in non-aqueous liquid) is added slowly and as the viscosity increases the mixer speed is increased to maintain a vortex. This is continued until the viscosity is 20,000 cPs±500 cPs measured on a Brookfield RVT viscometer with spindle 6 at 10 rpm at 25° C. 200 g of this paste is weighed into 250 ml beaker and aliquats of a 10% w/v solution of AR anhydrous sodium sulphate in deionised water is added from a burette. After each addition the paste is thoroughly stirred and the viscosity measured. A graph is plotted of viscosity versus the percentage by weight of anhydrous sodium sulphate in the paste. From this graph is determined the percentage sodium sulphate required in the paste to reduce the viscosity to 50% of its original value (property G) and the percentage viscosity retention on addition of 0.05% sodium sulphate (property H).

Storage, Loss and Complex Modulus Values G', G", and G* (properties A, B, C, F, K and L)

Polymer pastes are prepared containing 0.5% 0.880 ammonia, 0.05% sodium sulphate and sufficient polymer to give a viscosity of 20,000 cPs±500 cPs in deionised water, as above. The rheological properties of these pastes are determined using a Carri Med rheometer type 5010 using the following conditions:
(i) Oscillatory Mode
(ii) 4 cm diameter, 2° angle cone and flat plate
(iii) Measurement system inertia 9.7 dyne.cm.sec$^{-2}$
(iv) Shear rate factor 28.64
(v) Shear stress factor 0.05968
(vi) Measurement system gap 56 μm
(vii) Measurement system factor 0.00208333
(viii) Fluid density factor 0.00064983
(ix) Temperature 20° C.
(x) Frequency 1 Hz
(xi) Torque—variable 1,000 to 10,000 dyne.cm The complex modulus G*, the storage modulus G' and the loss modulus G" are recorded at 3,000 dyne.cm torque and indicate the rheological and visco-elastic properties.

Flushing Properties (I)

A printing paste was made up containing 0.5% of 0.880 ammonia, 10% of Hi Fast Blue 3 g, 12% of a polyethyl acrylate binder latex of 40% active solids content and sufficient polymer to give a viscosity of 20,000 cPs±500 cPs measured with the Brookfield RVT viscometer, spindle 6, 10 rpm, 25° C. (the pigment is obtained from BASF Corporation). This paste is printed through a 156T polyester monofilament screen with a 40 cm long isosceles triangle motif having a 10° apex angle pointing in the direction of the warp of the cloth and in the direction of the print machine roller traverse. The cloth is a plain weave 50/50 polyester/cotton in both warp and weft characterised by Ne36-×Ne36/80×53 (warp count×weft count/ends per inch×picks per inch). The cloth has been pre-resinated by padding at 60% expression from a solution containing 35 g/l of Uron resin BT350 (from BIP Chemicals) and 6.5 g/l magnesium chloride hexahydrate. The treated cloth is passed through a stenter at 150° C. for 3 minutes. The printing machine is a Johannes Zimmer laboratory screen printing machine type MDF240. Conditions used are a magnet pressure of 3, a traverse speed of 5 and bar size 1 (4 mm diameter). After printing the cloth is allowed to stand for 2 minutes at 65% RH at 20° C. and then dried and cured at 150° C. for 4 minutes. The flushing is determined by measuring the length from the tip of the apex of the triangle along the line bisecting the 10° apex angle to the limit of the flushed area. This length is quoted in millimeters. There is zero flushing when the value is zero and there is serious flushing, giving a poor print quality, when the value is high.

Transfer (properties D and M)

This test is designed to quantify the flow properties of a polymer paste and defines polymer structures giving pastes having visco elastic elements in their rheology. Pastes with a high degree of visco elasticity, for instance a high degree of linear soluble polymer, will not give adequate transfer of paste. The test is performed by preparing a polymer paste containing 0.5% of 0.880 ammonia and 0.05% sodium sulphate and sufficient polymer to give a viscosity of 20% cPs±500 cPs in deionised water, all as is done for measuring vicosity retention. This paste is printed on to a piece of pre-weighed cloth using a 156T polyester monofilament blotch area screen of dimensions 40 cm by 30 cm and then immediately reweighed. The printing machine and the printing conditions are the same as in the test for flushing except that the magnet pressure is 2 and the traverse speed is 3. The cloth is a plain weave cotton in both warp and weft characterised by Ne36-×Ne36/65×70. The cloth is not resinated and has previously been scoured in deionised water for 5 minutes at 60° C. then rinsed in deionised water and dried at 60° C. The paste transferred is expressed as (weight of cloth after printing minus weight of cloth)×8.333 g/m$^2$.

Percent Soluble (properties E and J)

This method is based on the separation of cross linked polymer microgels from a solution of polymer by centrifugation. The polymer content before and after centrifugation is determined by colloid titration, based on the stoichiometric precipitation of charged colloidal particles by titration with oppositely charged polymer using a visual indicator.

About 5 grams of a dispersion of the polymer in non-aqueous liquid is accurately weighed and added to 25 mls of 50/50 by volume 110° to 120° C. petroleum spirit/methanol mixture with stirring at room temperature (15° to 25° C.). The mixture is stirred for 2 minutes then 100 mls acetone is added. Stirring is continued for 5 minutes and then the precipitated polymer is filtered through a pre-dried (110° C.) and weighed Whatman no. 1 filter paper, air dried for 1 hour in a fume cupboard then dried at 110° C. for 2 hours, cooled in a dessicator and weighed. The percentage of polymer in the starting dispersion can thus be calculated.

Enough of this dispersion is added to deionised water with stirring to produce about 200 g viscous paste containing 0.5% by weight polymer. This is stirred at about 7,000 rpm for 1 minute using a Greaves mixer type STA. To 40 grams of this paste are added 210 ml deionised water containing dissolved therein 1.0 g sodium chloride and the mixture is carefully mixed to reduce the viscosity for centrifugation. This solution is stirred until homogeneous. Polypropylene centrifuge tubes (10 cm × 2.5 cm diameter) are filled and balanced by weighing with the polymer solution (using about 40 ml) and centrifuged for 6 hours using an MSE Minor S centrifuge operating at full speed (2480 × g). the top 10 mls of supernatant polymer solution are carefully pipetted off the compacted lower layer of hydrated polymer particles (if present) care being taken to collect the first 10 mls of solution and to avoid collecting gel particles. The supernatant polymer solution and a sample of the entire aqueous composition prior to centrifugation are subjected to colloid titration to determine the amount of soluble polymer in the supernatant liquor after centrifuging and the amount of polymer in the precentrifuged solution, thus giving a value for the percentage of soluble polymer in the initial polymer, namely properties E and J.

The colloid titration is performed using reagents supplied by Koch Light laboratories in sealed vials as follows.

Potassium polyvinyl sulphate (PVSK) 0.43 g when dissolved in deionised water and made to 1 liter gives a 0.0025N solution.

An approximately 13% aqueous solution of polydimethyl ammonium chloride (DADMAC) 3.4 g when dissolved in deionised water and made to 1 liter gives an approximately 0.0025N solution.

Tetradecyl dimethyl benzyl ammonium chloride dihydrate (Zephiramine) 0.050 grams dissolved in deionised water and made to 500 ml gives an accurate 0.0025N solution which is used to standardise the PVSK solution.

Toluidine blue indicator solution (2.5 mls of 2% solution) is made up to 50 mls with deionised water.

About 100 g of polymer solution is accurately weighed and 10 mls of DADMAC solution is added and the mixture stirred for 3 minutes. 0.5 mls of 0.1N ammonium hydroxide solution is added and 3 drops toluidine blue and the volume made to 30 mls with deionised water. Slow back titration of the excess DADMAC is conducted using standardised PVSK solution to a violet end point. This titration is repeated excluding the polymer as a blank solution and the anionic value of the solution being tested is the difference between the blank and the sample tighters multiplied by the normality of the PVSK solution and divided by the weight of polymer solution, and is expressed in milli equivalents per gram.

The dry polymeric powder or the dispersions of dry or aqueous polymer particles in non-aqueous liquid may be used as aqueous thickeners, adhesives or for other purposes in conventional manner. For instance distribution of polymer particles into water from a dispersion in non-aqueous liquid can be promoted by dispersing the dispersion in the presence of an oil-in-water emulsifier, in known manner.

The aqueous liquid that is being thickened by the particles is preferably a print paste of otherwise conventional formulation and may be used for printing textiles in known manner. Conventional effective amounts of polymer may be used, typically in the range 0.1 to 5% by weight. An advantage of the invention is that the print paste components can include electrolyte and surfactant whilst retaining the properties of the print paste. This broadens the range of pigments that may be used, as many such pigments are supplied commercially in combination with electrolyte and/or surfactant.

The following are examples of the invention.

EXAMPLE 1

A monomer solution is prepared comprising 59.6 g of a 50% aqueous acrylamide solution, 102.2 g of an 80% acrylic acid solution, 45.2 g 0.880 ammonia solution, 0.05 g methylene bis acrylamide, 0.135 g polyethylene glycol 400 diallyl ether, 0.3 g of 40% aqueous solution of pentasodium diethylene triamine pentacetate and 92.5 g water. This is homogenised into an oil phase comprising 10.5 g sorbitan mono oleate, 40 g 22.5% solution of a 2:1 molar ratio copolymer of stearyl methacrylate/methacrylic acid in SBP11, 94 g Pale Oil 150, 95.5 g SBP11 and 0.03 g azo bis isobutyro nitrile using a Silverson L2R mixer for 20 minutes on full speed. The monomer solution is transferred to a resin pot and deoxygenated with nitrogen whilst the temperature is adjusted to 20° C. The emulsion is polymerised by adding 3.0 g isopropyl alcohol, 6.0 ml of 1% w/v tertiary butyl hydroperoxide in SBP11 and 0.03 ml per minute of a 1% solution of sodium metabisulphite in water. The temperature rise is observed and when no further rise occurs complete polymerisation is assumed to have occurred. The emulsion is then distilled to remove water and the SBP11, providing a concentrated polymer dispersion.

This dispersion is rendered water dispersible by addition of 12 g of 7 mole ethoxylated nonyl phenol. Its various properties A to M are recorded.

Print pastes are prepared using this polymer and all give excellent print definition and colour value even when the pigment is supplied together with a large amount of electrolyte. This is polymer U.

When the process is repeated in the absence of the cross linkers, the intrinsic viscosity is about 10 dl/g.

EXAMPLES 2 AND 3

Polymers T and V are made by the same process but using 400 and 800 ppm cross linker respectively, instead of the 600 ppm in polymer U.

EXAMPLES 4 TO 8

Polymers O to S are made by the same general technique but on a large scale production plant and in the absence of the 1% isopropyl alcohol, that serves as chain transfer agent in polymers T to V. Again the intrinsic viscosity, when made in the absence of cross linker, is about 10.

EXAMPLE 9

Polymer W is made by the following method. A monomer solution is prepared comprising 788.4 gms of acrylamide, 287.6 gms of acrylic acid, 3.0 gms of a 40% solution of pentasodium diethylene triamine pentaacetate, 26.5 gms of 85% w/w formic acid solution in water, 25.6 gms of 69% w/w solution in water of triallyl methyl ammonium methosulphate, 1170.9 gms of water and 698.0 gms of a 20% w/w solution of ammonium in water.

This is homogenised into an oil phase comprising 105 gms of sorbitan mono-oleate, 90 gms of a 2:1 molar ratio copolymer of stearyl-methacrylate:methacrylic acid, 784 gms of Primol 352 oil, 1405 gms of SBP11 and 0.3 gms of azo-bis isobutyronitrile using a Silverson mixer. The emulsion is deoxygenated and polymerised by adding 0.6 gm of tertiary butyl hydroperoxide and 1.5 mls per minute at a 2% w/vol solution of sodium metabisulphite in water.

When no further temperature rise occurs the product is distilled under reduced pressure to remove water and SBP11 resulting in a concentrated dehydrated dispersion of polymer in oil. This can be rendered water dispersible by addition of 120 gms of a 7 mole ethoxylated nonyl phenol.

It will be seen that this polymer is made using about 1.5% of the stated cross linking agent and about 2.5% of the chain transfer agent.

When this process is repeated in the absence of the cross linking agent, the intrinsic viscosity is about 4 or 5 dl/g.

When pigmented print pastes are prepared using this polymer as thickener, it gives excellent print definition and colour yield with a wide range of pigment dispersions.

The properties of these polymers are all measured and compared against the measured properties of commercial cross linked polymers X, Y and Z, all of which are supplied commercially as print paste thickeners. Polymer X is Alcoprint PTF supplied by Allied Colloids Limited. Polymer Y is Polymer 475 supplied by Polymer Southern Inc. Polymer Z is Texipol 63-506 as supplied by Scott Bader and so presumably represents the best products that can be made by the processes known to them, including the processes described in EP No. 186361. Alcoprint and Texipol are trade marks. The results are as follows. In this table all results and polymers that are outside the scope of the invention are marked *.

respect but the best polymers of the invention are polymers Q, U and, especially, W.

We claim:

1. A particulate cross linked polymeric material formed from a water soluble ethylenically unsaturated monomer or blend of monomers comprising 10 to 100% ionic monomer and 0 to 90% non-ionic monomer and 0.005 to 3% (based on monomer) crosslinking agent and which has a dry particle size of below 20 $\mu$m, the polymeric material having a storage modulus G' of 600 to 1400 dynes/cm$^2$, a loss modulus G'' of 500 to 700 dynes/cm$^2$ and a viscosity retention of at least 80%.

2. A polymer according to claim 1 having a flushing value below 6 mm and a transfer value of 70 to 115 g/m$^2$.

3. A polymer according to claim 1 having a storage modulus G' of 950 to 1350, dynes/cm$^2$.

4. A polymer according to claim 1 having a storage modulus G' of at least 750 dynes/cm$^2$ and at least 0.5% sodium sulphate for 50% drop in viscosity.

5. A polymer according to claim 2 having a storage modulus G' of at least 750 dynes/cm$^2$ and having flushing value of below 3 mm.

6. A polymer according to claim 2 having a transfer value of at least 90 g/m$^2$ and flushing of below 3 mm.

7. A polymer according to claim 1 in which the cross linker comprises an allylic cross linker.

8. A polymer according to claim 7 in which the cross linker comprises a triallyl amine quaternary ammonium salt.

9. A polymer according to claim 1 that has been made by a process in which cross linker is added both at the beginning of the process and at or near the end of the process.

10. A polymer according to claim 1 that has been made by polymerising under conditions which, in the absence of the cross linker, would give intrinsic viscosity of from 3 to 6 dl/g.

11. A polymer according to claim 1 that has been made by a polymerisation process in which initiator is added at the rate of 5 to 20 ppm per minute substantially throughout the process.

12. A polymer according to claim 1 that has been made by polymerisation in the presence of chain transfer agent.

| Polymer | O* | P* | Q | R* | S* | T | U | V* | W | X* | Y* | Z* |
|---|---|---|---|---|---|---|---|---|---|---|---|---|
| Cross Linker ppm | 200 | 300 | 350 | 400 | 500 | 400 | 600 | 800 | 1500 | | | |
| % Soluble | 31.3 | 61.5 | 59.7 | 47.0 | 27.4* | 52.6 | 43.1 | 25.4* | 59 | 18.6* | 19.2* | 24.7* |
| % Viscosity Retention | 98.5 | 94.6 | 84.5 | 68.1* | 27.9 | 101.7 | 87.9 | 83.8 | 88 | 4.7* | 66.4* | 29.0* |
| % Na$_2$SO$_4$ for 50% drop | 0.93 | 0.86 | 0.27 | 0.10* | 0.055* | 1.02 | 0.58 | 0.27 | 0.58 | 0.013* | 0.166* | 0.04* |
| Flushing | 0 | 0 | 1 | 6 | 16* | 0 | 1 | 12* | 1 | 19* | 28* | 15* |
| Transfer | 17.9* | 40.3* | 93.7 | 98.0 | 114.8 | 71.6 | 99.3 | 112.3 | 95 | 125.3 | 83.4 | 104.7 |
| G' | 568* | 600 | 777 | 836 | 2025* | 697 | 1067 | 1428* | 1183 | 1442* | 1408* | 1601* |
| G'' | 415* | 542 | 582 | 598 | 837* | 642 | 653 | 665 | 582 | 1151* | 273* | 821 |
| G* | 720* | 809 | 970 | 1028 | 2200* | 950 | 1260 | 1600* | 1325 | 1870* | 1440 | 1800 |

From this it will be apparent that polymers S and V, and the commercial polymers X, Y and Z all fail because, inter alia, the flushing and G' values are too high whilst polymers O and T fail because, inter alia, the various modulus and transfer values are too low. Although polymer R is almost satisfactory for most purposes it is on the borderline and, in particular, the effect of electrolyte is larger than is desired. Polymer P likewise is on the borderline in that its modulus values are close to the lower limits and its transfer value is below the preferred lower limit. Polymer T is better in this fer agent.

13. A polymer according to claim 1 that has been made by reverse phase polymerisation, and in which the particles are below 4 $\mu$m in size and are present as a stable dispersion in a non-aqueous liquid.

14. A polymer according to claim 1 formed from monomers comprising 10 to 100% by weight acrylic acid (as free acid or water soluble salt) and 0 to 90% by weight acrylamide.

* * * * *